US012513199B2

(12) United States Patent
Shashanka et al.

(10) Patent No.: US 12,513,199 B2
(45) Date of Patent: Dec. 30, 2025

(54) METHOD AND ELECTRONIC DEVICE FOR MANAGING SENSITIVE DATA BASED ON SEMANTIC CATEGORIZATION

(71) Applicant: CONCENTRIC SOFTWARE, INC., San Mateo, CA (US)

(72) Inventors: Madhusudana Shashanka, Austin, TX (US); Leomart Reyes Crisostomo, Sunnyvale, CA (US); Shankar Subramaniam, Cupertino, CA (US); Pankaj Kumar Gupta, Jaipur (IN)

(73) Assignee: CONCENTRIC SOFTWARE, INC., San Mateo, CA (US)

( * ) Notice: Subject to any disclaimer, the term of this patent is extended or adjusted under 35 U.S.C. 154(b) by 0 days.

(21) Appl. No.: 19/232,533

(22) Filed: Jun. 9, 2025

(65) Prior Publication Data
US 2025/0310384 A1    Oct. 2, 2025

Related U.S. Application Data

(63) Continuation-in-part of application No. 18/099,940, filed on Jan. 21, 2023, now Pat. No. 12,346,476.

(51) Int. Cl.
*H04L 9/40* (2022.01)
*G06F 16/906* (2019.01)

(52) U.S. Cl.
CPC .......... *H04L 63/205* (2013.01); *G06F 16/906* (2019.01)

(58) Field of Classification Search
CPC .............................. H04L 63/205; G06F 16/906
See application file for complete search history.

(56) References Cited

U.S. PATENT DOCUMENTS

| 8,745,091 | B2 * | 6/2014 | McHenry ................ G06F 16/00 707/706 |
| 9,015,301 | B2 * | 4/2015 | Redlich ............... G06F 16/2465 707/777 |
| 9,734,169 | B2 | 8/2017 | Redlich et al. |
| 10,984,780 | B2 | 4/2021 | Bellegarda |
| 11,853,329 | B2 * | 12/2023 | Hawco .................. G06F 16/221 |

(Continued)

FOREIGN PATENT DOCUMENTS

EP    3777042 B1    4/2024

*Primary Examiner* — Han Yang
(74) *Attorney, Agent, or Firm* — Evergreen Valley Law Group; Kanika Radhakrishnan

(57) ABSTRACT

Embodiments herein disclose a method for managing at least one document by an electronic device. The method includes receiving at least one document in an electronic form, where the document includes a plurality of content. Further, the method includes determining at least one semantic category associated with the document and a metadata associated with the document. Further, the method includes embedding custom data within the at least one document, where the custom data comprises the at least one of the semantic category associated with the at least one document. Further, the method includes determining at least one among privacy persona and classification label of the document based on the semantic category associated with the document and the metadata associated with the document. Further, the method includes determining access to the document based on at least one among the privacy persona and the classification label of the document.

18 Claims, 4 Drawing Sheets

(56) References Cited

U.S. PATENT DOCUMENTS

| | | | |
|---|---|---|---|
| 11,947,574 B2 * | 4/2024 | Day, Jr. ................... | G06F 9/451 |
| 2021/0256115 A1 * | 8/2021 | Shashanka .............. | G06F 40/30 |
| 2022/0338756 A1 | 10/2022 | Dzhekiev et al. | |
| 2023/0273992 A1 * | 8/2023 | Shashanka ............ | G06F 40/279 |
| | | | 726/25 |
| 2024/0202215 A1 * | 6/2024 | Shashanka ............ | G06F 16/285 |
| 2025/0013884 A1 | 1/2025 | Polleri et al. | |

* cited by examiner

METHOD AND ELECTRONIC DEVICE FOR MANAGING SENSITIVE DATA BASED ON SEMANTIC CATEGORIZATION

CROSS-REFERENCE TO RELATED APPLICATION

This application is a continuation-in-part of U.S. patent application Ser. No. 18/099,940, entitled "METHOD AND ELECTRONIC DEVICE FOR MANAGING SENSITIVE DATA BASED ON SEMANTIC CATEGORIZATION" filed on Jan. 21, 2023, which is hereby incorporated by reference in its entirety.

FIELD OF INVENTION

The present disclosure relates to data management, and more specifically related to a method and an electronic device for managing document(s) based on semantic categorization.

BACKGROUND OF INVENTION

In general, enterprises must protect sensitive data/business-critical data/personal data/private data about their customers/users, as well as everything in between, from competitors to vendors. Telephone numbers, addresses, credit card information, personal health-related or medical information, and so on are examples of sensitive data/business-critical data/personal data. Many enterprises routinely experience data breaches affecting the personal data of hundreds of thousands or millions of people, which can result in regulatory fines, litigation, loss of reputation and customer trust, and, in extreme cases, business liquidation. There are several ways in which enterprises protect sensitive data from data breaches in existing systems, for example,
  a. Identifying a location of the sensitive data; and
  b. Implementing a classification mechanism.

One common way for enterprises to protect sensitive data from data breaches is by identifying where the sensitive data resides—which databases, documents, files, etc.—so that sensitive data can be properly secured. While the sensitive data in databases are easily identified, detecting such data buried in unstructured files presents difficult challenges and remains an open problem. Two primary approaches are commonly used in existing systems to address the problem.

The first approach is to attempt to transform the problem of detecting sensitive data into a search problem (e.g., BigID). This begins with compiling a list of individuals (customers, employees, etc.) whose personal data must be secured and protected. Such data can be obtained from an organization's IT databases, such as a Customer Relationship Management (CRM) system, Human Resource (HR) and/or payroll systems, and so on. Once specific data that needs to be protected is known, an entire repository of unstructured documents can be searched for each person's private data type (e.g., date of birth, phone number, bank account, etc.). Searching for known personal data is a good strategy. However, accuracy and completeness are entirely dependent on data source from which the personal data to be searched is gathered. Personal data in the data source could be incorrect or incomplete.

The second approach is typically based on specific patterns of each personal data type. A social security number, for example, will have 9 digits and will follow the pattern xxx-xx-xxxx. These patterns and rules can be encoded in "regular expressions," and textual content in each file can be searched for matches to these pre-specified patterns. Aside from the specified patterns, existing systems frequently rely on whether surrounding words known as the context immediately preceding or following the matched string contain specific words.

For example, if a string matches the pattern of the social security number, existing systems will examine context words to see if the context words include words like "social" and "security." Using regular expression patterns and context words poses special challenges. There are no predefined patterns that are distinct enough to distinguish certain private data types from others. As a result, many false positives occur. Bank account numbers in the United States, for example, do not follow any distinct patterns other than being any set of four or more digits in length. Context words can be useful in such situations, but context words can have many variations and are not a reliable way to address false positives. Furthermore, there may be no reliable context words for many private data types. The false positives add to the workload of already overburdened security teams, and users lose faith in the effectiveness of existing systems riddled with flaws. Furthermore, using specific patterns/regular expressions to match every word in every document is computationally expensive. More specific patterns there are to be matched against, the higher the computational cost and this can make the second approach unsustainable in the long run.

Some types of private and highly sensitive data do not lend themselves to either approach due to the absolute variety with which it manifests itself. Medical data, such as prescriptions or medical diagnosis/test results, is a good example. Each one may differ greatly from the others in terms of data, but they all represent highly sensitive categories that must be safeguarded.

A second way enterprises protect sensitive data/documents from data breaches is by implementing a classification mechanism. A goal of the classification mechanism is to assign each document a "classification label" from a set of classification levels. A three-level labeling system such as "public," "internal," and "confidential" or a more elaborate five-level labeling system such as "public," "internal," "confidential," "secret," and "top secret". Processes and guidelines/rules are put in place as part of the classification mechanism development to govern how documents are handled (stored, shared, given access to, etc.) based on their assigned classification level.

Enterprises rely on tools to implement the classification mechanism. Several tools exist that allow classification labels to be written to file metadata (or attributes). Microsoft, for example, provides software that allows such labels to be written into a document's metadata. However, a decision about what classification label to use for a given document is almost always left to the users. Despite best intentions and detailed instructions for assigning classification labels, this user-driven classification assignment is fraught with practical difficulties. Firstly, it is difficult to motivate all users to assign classification labels to every document they work on. Second, any user-driven process is error-prone due to differences in user behavior and how cautious they are. Although it is possible to assign classification labels strictly based on document metadata, this is a very raw approach that is ineffective at appropriately assigning classification labels to an entire corpus. Furthermore, existing systems are incapable of more reliable alternative approaches based on the nature of information contained within the document. This is because existing systems do not have the ability to ascertain or access a document's semantic category.

Thus, it is desired to address the above-mentioned disadvantages or other shortcomings or at least provide a useful alternative for managing sensitive data based on semantic categorization.

BRIEF SUMMARY OF THE INVENTION

Accordingly, embodiments herein disclose a method for managing at least one document by an electronic device. The method includes receiving, by the electronic device, at least one document in an electronic form, where the document includes a plurality of content. Further, the method includes determining, by the electronic device, at least one semantic category associated with the at least one document and a metadata associated with the at least one document. Further, the method includes embedding, by the electronic device, custom data within the at least one document, where the custom data comprises the at least one semantic category associated with the at least one document. Further, the method includes determining, by the electronic device, at least one of a privacy persona of the at least one document and a classification label of the at least one document based on the at least one semantic category associated with the at least one document and the metadata associated with the at least one document. Further, the method includes determining, by the electronic device, an access to the at least one document based on the at least one of the privacy persona of the at least one document and the classification label of the at least one document.

In an embodiment, the custom metadata further comprises at least one subcategory associated with each of the at least one semantic category associated with the at least one document.

The method as claimed in claim 1, the method further comprises storing, by the electronic device, the custom metadata along with the at least one document in a memory of the electronic device.

In an embodiment, the method further includes classifying, by the electronic device, the at least one document based on the classification label.

In an embodiment, the method further includes generating, by the electronic device, metadata representing the at least one determined privacy persona of the at least one document; and storing, by the electronic device, the metadata along with the at least one document in a memory of the electronic device.

In an embodiment, the semantic category associated with the at least one document is determined based on Machine Learning (ML) technique.

In an embodiment, the privacy persona mapping includes a mapping of a plurality of semantic categories to a plurality of privacy persona and a user accessibility data based on each of the plurality of privacy persona. The classification label is determined using a mapping between a plurality of semantic categories and a plurality of metadata associated with a plurality of documents.

In an embodiment, the method further includes generating, by the electronic device, a new metadata representing the at least one determined classification label of the at least one document; and storing, by the electronic device, the new metadata along with the at least one document in a memory of the electronic device.

In an embodiment, the method further includes determining, by the electronic device, at least one of a client-specific policy and rules on the classification label based on the at least one metadata associated with the at least one document. Further, the method includes modifying, by the electronic device, the at least one classification label of the at least one document based on at least one of the client-specific policy and the rules. Further, the method includes storing, by the electronic device, the at least one modified classification label of the at least one document in a memory of the electronic device.

Accordingly, embodiments herein disclose the electronic device for managing at least one document. The electronic device includes a document management module coupled with a processor and a memory. The document management module receives the at least one document in the electronic form, where the document includes the plurality of content. Further, the document management module determines the at least one semantic category associated with the at least one document and the metadata associated with the at least one document. Further, the document management module embeds custom data within the at least one document, where the custom data comprises the at least one semantic category associated with the at least one document. Further, the document management module determines at least one of the privacy persona of the at least one document and the classification label of the at least one document based on at least one semantic category associated with the at least one document and the metadata associated with the at least one document. Further, the document management module determines the access to the at least one document based on at least one of the privacy persona of the at least one document and the classification label of the at least one document.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein, and the embodiments herein include all such modifications.

DESCRIPTION OF THE DRAWINGS

This invention is illustrated in the accompanying drawings, throughout which like reference letters indicate corresponding parts in the various figures. The embodiments herein will be better understood from the following description with reference to the drawings, in which.

DETAILED DESCRIPTION OF INVENTION

Figure 1:
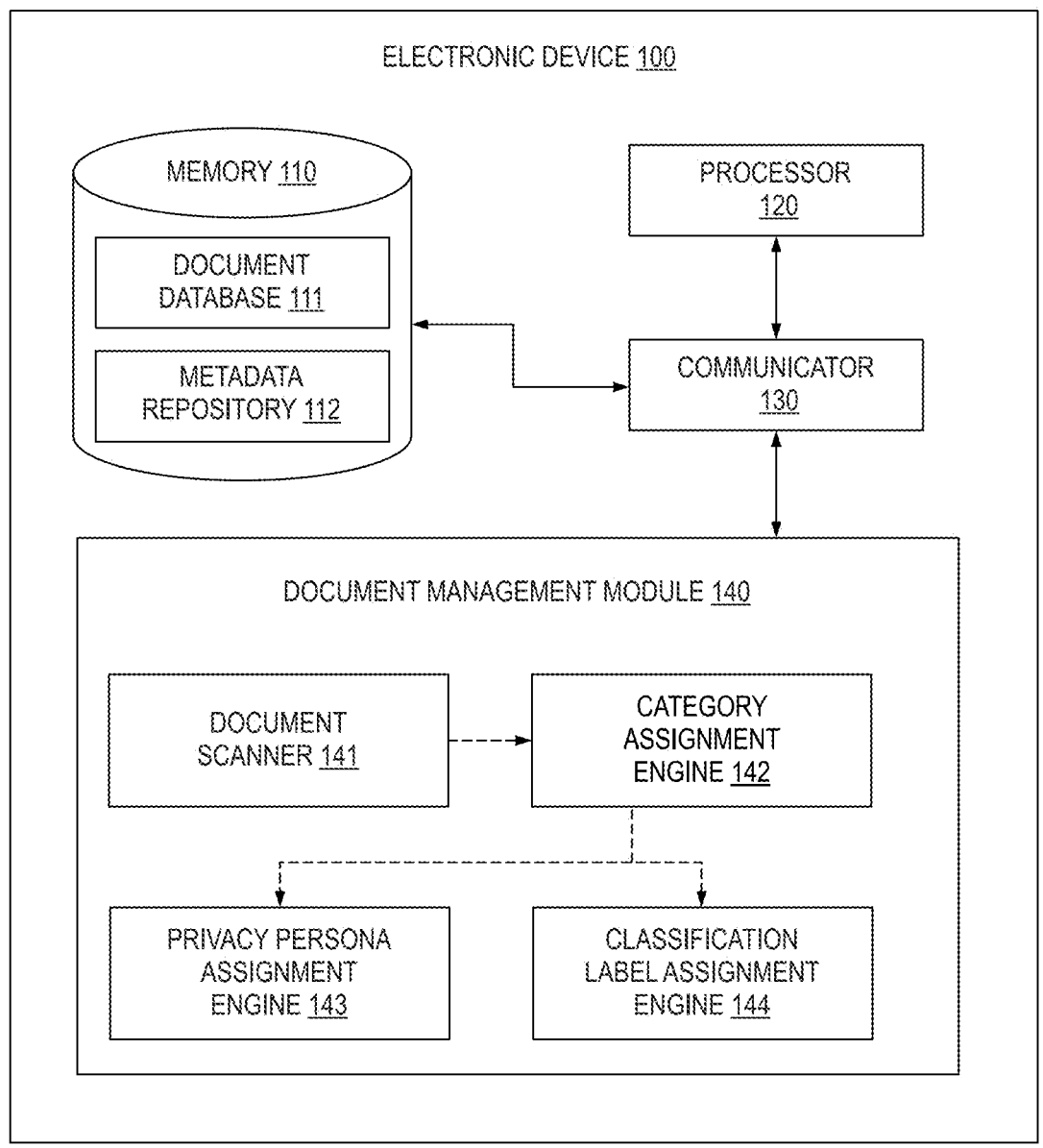
FIG. 1 illustrates a block diagram of an electronic device for managing at least one document, according to an embodiment as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention The accompanying drawings are used to help easily understand various technical features and the embodiments presented herein are not limited by the accompanying drawings. As such, the present disclosure should be construed to extend to any alterations, equivalents, and substitutes in addition to those which are particularly set out in the accompanying drawings. Although the terms first, second, etc. may be used herein to describe various elements, these elements should not be limited by these terms. These terms are generally only used to distinguish one element from another.

Accordingly, embodiments herein disclose a method for managing at least one document by an electronic device. The method includes receiving, by the electronic device, the at least one document in an electronic form, where the document includes a plurality of content. Further, the method includes determining, by the electronic device, at least one of a semantic category associated with the at least one document and a metadata associated with the at least one document. Further, the method includes embedding, by the electronic device, custom data within the at least one document, the custom data comprising the at least one semantic category associated with the at least one document. Further, the method includes determining, by the electronic device, at least one of a privacy persona of the at least one document and detection of privacy entities, and a classification label of the at least one document based on at least one semantic category associated with the at least one document and the metadata associated with the at least one document. Further, the method includes determining, by the electronic device, an access to the at least one document based on at least one of the privacy persona of the at least one document and the classification label of the at least one document.

Accordingly, embodiments herein disclose the electronic device for managing at least one document. The electronic device includes a document management module coupled with a processor and a memory. The document management module receives the at least one document in the electronic form, where the document includes the plurality of content. Further, the document management module determines the at least one semantic category associated with the at least one document and the metadata associated with the at least one document. Further, the document management module embeds custom data within the at least one document, the custom data comprising the at least one semantic category associated with the at least one document. Further, the document management module determines at least one of the privacy persona of the at least one document and the classification label of the at least one document based on the at least one semantic category associated with the at least one document and the metadata associated with the at least one document. Further, the document management module determines the access to the at least one document based on at least one of the privacy persona of the at least one document and the classification label of the at least one document.

Unlike existing methods and systems, the proposed method enables embedding of the semantic category and subcategory associated with the document, which provides significant functional advantages. This approach enables the semantic category to persist with the file itself as custom metadata, allowing external systems and tools (e.g., Data Loss Prevention (DLP) systems, generative AI tools, and access control frameworks) to make context-aware decisions based on both the document's sensitivity and its semantic nature. By embedding such metadata directly into the document, the system supports more granular and intelligent enforcement policies, such as selectively blocking transmissions, triggering alerts, or notifying appropriate departmental stakeholders. This fine-grained control improves data governance, enhances compliance monitoring, and strengthens overall enterprise data security.

Unlike existing methods and systems, the proposed method enables the electronic device to recognize unstructured document(s) containing privacy/sensitive information. This is an important first step in all future data security efforts. Knowing what document(s) contain sensitive information and what type of sensitive information allows data security teams to prioritize their efforts and secure these document(s) appropriately.

Unlike existing methods and systems, the proposed method enables the electronic device to automatically detect privacy information (such as, but not limited to, name, age, address, date of birth, gender/sex, unique identification numbers such as SSN, tax identification number, employee identification number, student identification number, driver's license, medical insurance number, passport number; financial information such as bank account number, credit/debit card number; health information such as prescriptions, medical diagnoses, etc.) and associated privacy persona (such as, but not limited to employee, client, customer, consumer, patient, faculty, student, vendor, partner, contractor, etc.) based on the semantic category of the document(s).

Unlike existing methods and systems, the proposed method allows the electronic device to automatically assign appropriate classification labels to a corpus of the document (s). This is a critical step for enterprises that have a classification mechanism in place and determines the success of such mechanism. The contents of the document(s) are the primary determinant of how sensitive the document(s) is. In other words, the classification labels of the document(s) are directly dependent on the contents and what the semantic meaning encoded within the document(s) implies. Any approach that does not fully consider the semantic nature of the document's contents is doomed to be subpar and ineffective.

Unlike existing methods and systems, the proposed method allows the electronic device to utilize the metadata of the document(s) to modify/refine the classification label assigned based on the semantic category of the document(s).

Referring now to the drawings, and more particularly to FIGS. 1 through 4, where similar reference characters denote corresponding features consistently throughout the figures, there are shown preferred embodiments.

FIG. 1 illustrates a block diagram of an electronic device 100 for managing at least one document, according to an embodiment as disclosed herein. Examples of the electronic device 100 include, but are not limited to a smartphone, a tablet computer, a Personal Digital Assistance (PDA), an Internet of Things (IoT) device, a wearable device, etc.

In an embodiment, the electronic device 100 includes a memory 110, a processor 120, a communicator 130, and a data management module 140.

In an embodiment, the memory 110 includes a document database 111 and a metadata repository 112. The document database 111 stores at least one document in an electronic form, a client-specific policy, and rules on the classification label. The metadata repository 112 stores metadata/new metadata associated with the at least one document. The memory 110 stores instructions to be executed by the processor 120. The memory 110 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 110 may, in some examples, be considered a non-transitory storage medium. The term "non-transitory" may indicate that the storage medium is not embodied in a carrier wave or a propagated signal. However, the term "non-transitory" should not be interpreted that the memory 110 is non-movable. In some examples, the memory 110 can be configured to store larger amounts of information than the memory. In certain examples, a non-transitory storage medium may store data that can, over time, change (e.g., in Random Access Memory (RAM) or cache). The memory 110 can be an internal storage unit or it can be an external storage unit of the electronic device 100, a cloud storage, or any other type of external storage.

The processor 120 communicates with the memory 110, the communicator 130, and the display (140). The processor 120 is configured to execute instructions stored in the memory 110 and to perform various processes. The processor 120 may include one or a plurality of processors, a general-purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator 130 is configured for communicating internally between internal hardware components and with external devices (e.g. another electronic device, server, etc.) via one or more networks (e.g. Radio technology). The communicator 130 includes an electronic circuit specific to a standard that enables wired or wireless communication.

The data management module 140 is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an embodiment, the data management module 140 receives the at least one document in the electronic form, where the document includes a plurality of content. The data management module 140 determines at least one of a semantic category associated with the at least one document and the metadata associated with the at least one document. The semantic category associated with the at least one document is determined based on Machine Learning (ML) techniques. The data management module 140 embeds custom data within the at least one document, where the custom data includes the at least one semantic category associated with the at least one document. The data management module 140 determines at least one of a privacy persona of the at least one document and a classification label of the at least one document based on at least one semantic category associated with the at least one document and the metadata associated with the at least one document. The data management module 140 determines an access to the at least one document based on at least one of the privacy persona of the at least one document and the classification label of the at least one document. Mapping of the privacy persona privacy persona includes a mapping of a plurality of semantic categories to the privacy persona of a plurality of privacy persona and a user accessibility data based on each of the plurality of privacy persona and wherein the classification label is determined using a mapping between a plurality of semantic categories and a plurality of metadata associated with a plurality of documents.

In an embodiment, the custom metadata can further include at least one subcategory associated with each of the at least one semantic category associated with the at least one document.

In an embodiment, the data management module 140 stores the custom metadata along with the at least one document in a memory of the electronic device.

In an embodiment, the data management module 140 classifies the at least one document based on the classification label.

In an embodiment, the data management module 140 generates metadata representing the at least one determined privacy persona of the at least one document. The data management module 140 stores the metadata along with the at least one document in the memory 110 of the electronic device 100.

The data management module 140 generates the new metadata representing the at least one determined classification label of the at least one document. The data management module 140 stores the new metadata along with the at least one document in the memory 110 of the electronic device 100.

The data management module 140 determines at least one of the client-specific policy and the rules on the classification label based on the at least one metadata associated with the at least one document. The data management module 140 modifies the at least one classification label of the at least one document based on at least one of the client-specific policy and the rules. The data management module 140 stores the at least one modified classification label of the at least one document in the memory 110 of the electronic device 100. Further, the same is applicable to the privacy persona determination procedure as well. For example, consider a client which is a payroll processing company, the semantic category of "HR/paystub" should map to privacy-persona= "customers" where as in any other company, the same semantic category would map to privacy-persona= "employees".

In an embodiment, the data management module 140 includes a document scanner 141, a category assignment engine 142, a privacy persona assignment engine 143, and a classification label assignment engine 144.

The document scanner 141 receives the at least one document in the electronic form, where the document includes the plurality of content. The category assignment engine 142 assigns/determines at least one semantic category/semantic categories associated with the at least one document and the metadata associated with the at least one document. The category assignment engine 142 further embeds custom data within the at least one document, where the custom data includes the at least one semantic category associated with the at least one document. The custom metadata can further include at least one subcategory associated with each of the at least one semantic category associated with the at least one document. The category assignment engine 142 stores the custom metadata along with the at least one document in a memory of the electronic device. In an embodiment, the category assignment engine 142 generates custom data fields, which may be structured in a standardized format such as but not limited to Extreme Memory Profile (XMP), Extensible Markup Language (XML), or JavaScript Object Notation (JSON). The custom metadata is then embedded within the document itself, which can be read through enterprise tools such as Data loss prevention (DLP) tools, generative AI (GenAI), and alerting system.

One of the primary advantages of embedding custom metadata—specifically, the semantic category and subcategory—within a document is that the categorization becomes an intrinsic part of the document itself. Unlike external categorization mechanisms that require contextual inference or detached storage systems, embedding semantic metadata ensures that the document can carry its meaning and categorization wherever it goes (e.g., gets downloaded). This embedded metadata allows any downstream system that interacts with the file, such as content management systems, Data Loss Prevention (DLP) tools, or generative AI platforms, to instantly recognize and respond to the semantic context of the document without additional processing or lookups.

This capability is particularly beneficial in environments that require strict regulatory compliance, data governance, or operational oversight. By incorporating semantic categorizations as part of the document metadata, organizations can enforce fine-grained security and compliance policies. Unlike traditional sensitivity labels alone, semantic categories enable policy enforcement that is aligned with the actual content and purpose of the document.

Furthermore, this feature enables enhanced interoperability and extensibility. As the embedded metadata is stored in a standardized format, third-party applications such as monitoring tools, content analytics engines, and generative AI (GenAI) assistants can read and process this metadata to make intelligent decisions. For example, a GenAI system can choose to exclude "Legal" or "HR" documents from training data or use semantic tags to tailor its responses according to the specific department or topic. Similarly, automated workflows can route documents based on their semantic tags to appropriate personnel for approval, review, or retention, thereby improving operational efficiency.

Since the metadata is inseparable from the document, it provides traceable and tamper-resistant categorization that aids in tracking document use, access violations, and compliance checks over time. This persistent tagging supports organizations in maintaining a robust audit trail and reinforces trust in the data management lifecycle. Overall, embedding semantic metadata enhances both the technical functionality and practical utility of enterprise data categorization systems.

Moreover, embedding the semantic category enables seamless alignment between content categorization and downstream enterprise actions. By storing this contextual information directly in the file, other enterprise systems—such as access governance tools, data lifecycle management platforms, and retention policy engines—can automatically interpret and act upon the embedded metadata. For example, during a permission audit, files identified as over-permissioned can be programmatically routed to appropriate departments based on the embedded semantic categorization, without requiring external lookups. This facilitates department-specific data governance where, say, the Finance department can autonomously enforce rules regarding where Finance-related documents should reside and how long they should be retained, depending on their semantic subcategory (e.g., Taxation vs. Budget Planning). Embedding such metadata not only streamlines data governance workflows but also ensures persistent, context-aware control over documents throughout their lifecycle.

The privacy persona assignment engine 143 determines the privacy persona of the at least one document based on the semantic category associated with the at least one document and stores information associated with the privacy persona into the memory 110. The privacy persona assignment engine 143 maintains the document database 111 along with several mappings of categories to private information and privacy personae. There are two kinds of mappings.
 a. Client-specific mappings, which are only applicable within their respective client environments;
 b. Default mappings, which are applicable across all client environments.

The client-specific mappings take precedence over the default mappings. For example, consider the semantic category "HR/Paystubs". Almost all clients will associate this category with the privacy persona "employee," and the default mapping will reflect that. If a client is a payroll processing company that processes paystubs for other companies' employees, the privacy persona for paystubs should be "client employee" or "customer employee." In that case, this information will be added to the client's specific mapping. Because the client-specific mappings take precedence, the persona for the paystub category for that client is correctly set to "client employee," while it is set to "employee" for all other clients.

In another case, consider mapping for a hypothetical client who provides medical services. For such a client, a client-specific mapping will map the semantic category "Health/Drug Test Results" to the privacy persona "Patient" while it will be mapped to persona "employee" for all other clients.

The classification label assignment engine 144 determines the classification label/classification labels of the at least one document based on the semantic category/semantic categories associated with the at least one document and/or the metadata associated with the at least one document and stores information associated with the classification label into the memory 110.

The classification label assignment engine 144 determines maintains the document database 111 along with several mappings of categories to the classification labels. There are two kinds of mappings.
   a. Client-specific mappings, which are only applicable within their respective client environments; and
   b. Default mappings, which are applicable across all client environments.

The client-specific mappings take precedence over the default mappings. And if no client-specific mapping is present in the document database 111, the default mappings will apply. Once the classification label/classification labels corresponding to the semantic category/semantic categories are found, the electronic device 100 checks if there are any client-specific policies/rules on the classification label/classification labels based on the metadata. If there are, the classification label is modified based on the policies, and the answer is written to the metadata repository 112.

Consider the following example of a medical service provider with various categories and classifications, as illustrated in Table 1.

TABLE 1

| No. | Category/Classification |
| --- | --- |
| 1 | {Category: "HR/Paystub", Classification: "Confidential"} |
| 2 | {Category: "Health/Medical Prescription", Classification: "Confidential"} |
| 3 | {Category: "HR/Job Description", Classification: "Public"} |

Job descriptions should be classified as "public" by default. However, suppose this is a confidential search, the enterprise/company places the job description document in a separate folder and creates a policy stating that all files in this designated folder should be labeled "confidential." For example, metadata-policy for assigning the classification label "If file path=="Shared Drive/HR/Executive Search/Job Description/" assign Classification: "Confidential".

At least one of the plurality of modules may be implemented through an AI model. This includes a module that learns the mapping from semantic categories to classification levels and a module that learns the mappings from semantic categories to privacy/persona. A function associated with the AI model may be performed through the non-volatile memory, the volatile memory, and the processor 120. One or a plurality of processors controls the processing of the input data in accordance with a predefined operating rule or AI model stored in the non-volatile memory and the volatile memory. The predefined operating rule or AI model is provided through training or learning. Here, being provided through learning means that, by applying a learning algorithm to a plurality of learning data, a predefined operating rule or AI model of the desired characteristic is made. The learning may be performed in a device itself in which AI according to an embodiment is performed, and/o may be implemented through a separate server. The learning algorithm is a method for training a predetermined target device (for example, a robot) using a plurality of learning data to cause, allow, or control the target device to decide or predict. Examples of learning algorithms include, but are not limited to, supervised learning, unsupervised learning, semi-supervised learning, or reinforcement learning.

In one example embodiment, training data including file categories and all associated metadata including but not limited to file name, file path, permissions, etc. as well as the classification label, PII (personal identifiable information) entities and PII personas are used to train a Bayesian Network of the electronic device 100. The Bayesian Network is a data structure representing a graph with nodes as features and directed edges indicating relationships between features. Learning algorithms learn the structure of the graph from the training data as well as parameters of the network—parameters include joint probability distribution tables for each node based on all the possible values taken by parent nodes. The Bayesian Networks learned from data across clients are also used to improve the determinations of classification labels and PII entities/PII persona.

The AI model may consist of a plurality of neural network layers. Each layer has a plurality of weight values and performs a layer operation through a calculation of a previous layer and an operation of a plurality of weights. Examples of neural networks include, but are not limited to, Convolutional Neural Network (CNN), Deep Neural Network (DNN), Recurrent Neural Network (RNN), Restricted Boltzmann Machine (RBM), Deep Belief Network (DBN), Bidirectional Recurrent Deep Neural Network (BRDNN), Generative Adversarial Networks (GAN), and deep Q-networks.

Although the FIG. 1 shows various hardware components of the electronic device 100 but it is to be understood that other embodiments are not limited thereon. In other embodiments, the electronic device 100 may include less or more number of components. Further, the labels or names of the components are used only for illustrative purpose and does not limit the scope of the invention. One or more components can be combined to perform the same or substantially similar function to manage the at least one document.

Figure 2:
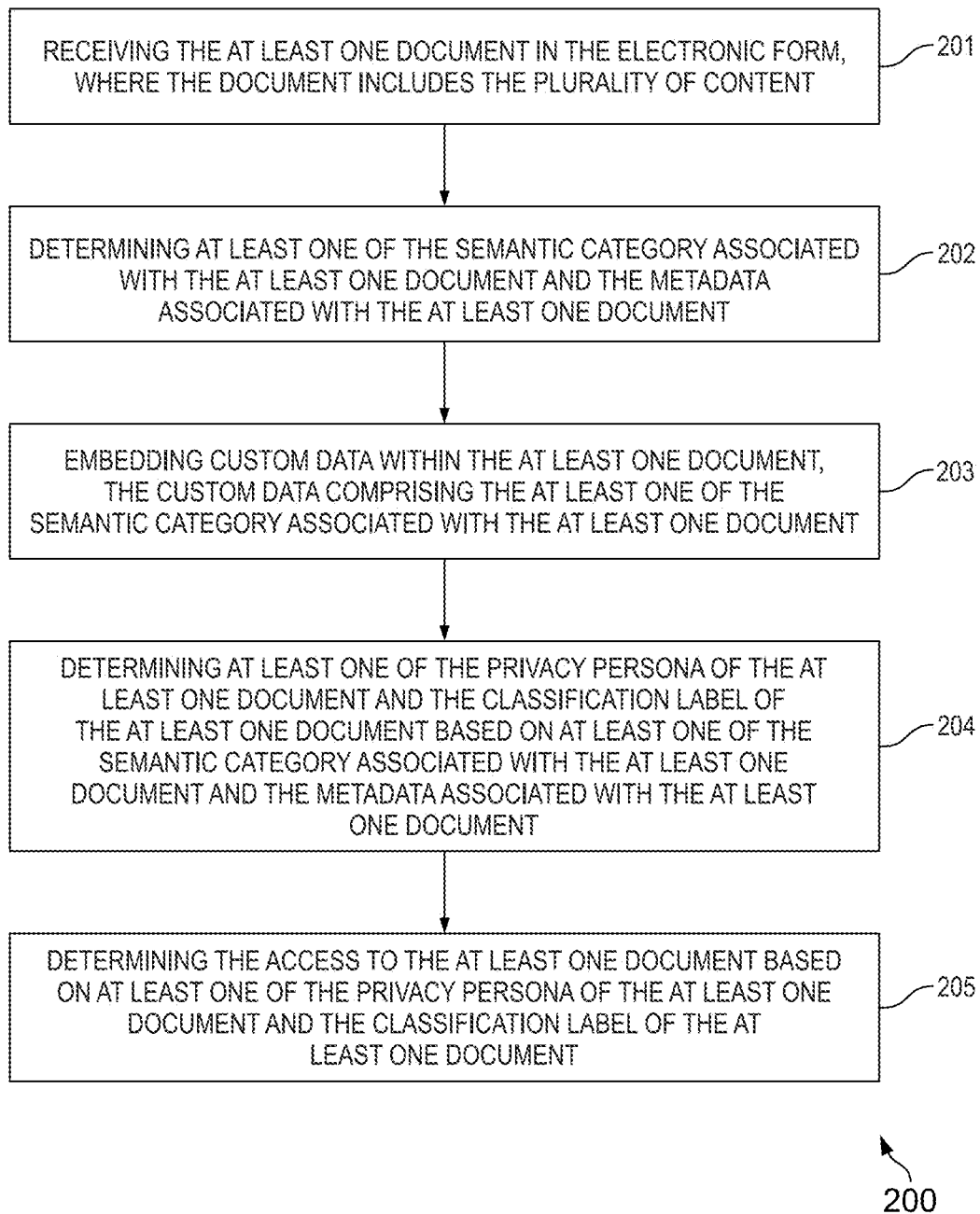
FIG. 2 is a flow diagram illustrating a method for managing the at least one document, according to an embodiment as disclosed herein.

FIG. 2 is a flow diagram 200 illustrating a method for managing the at least one document, according to an embodiment as disclosed herein. The electronic device 100 performs various steps to manage the at least one document.

At step 201, the method includes receiving the at least one document in the electronic form, where the document includes the plurality of content. At step 202, the method includes determining at least one semantic category associated with the at least one document and the metadata associated with the at least one document. At step 203, the method includes embedding custom data within the at least one document, the custom data comprising the at least semantic category associated with the at least one document. At step 204, the method includes determining at least one of the privacy persona of the at least one document and the classification label of the at least one document based on at least one semantic category associated with the at least one document and the metadata associated with the at least one document. At step 205, the method includes determining the access to the at least one document based on at least one of the privacy persona of the at least one document and the classification label of the at least one document.

Figure 3:
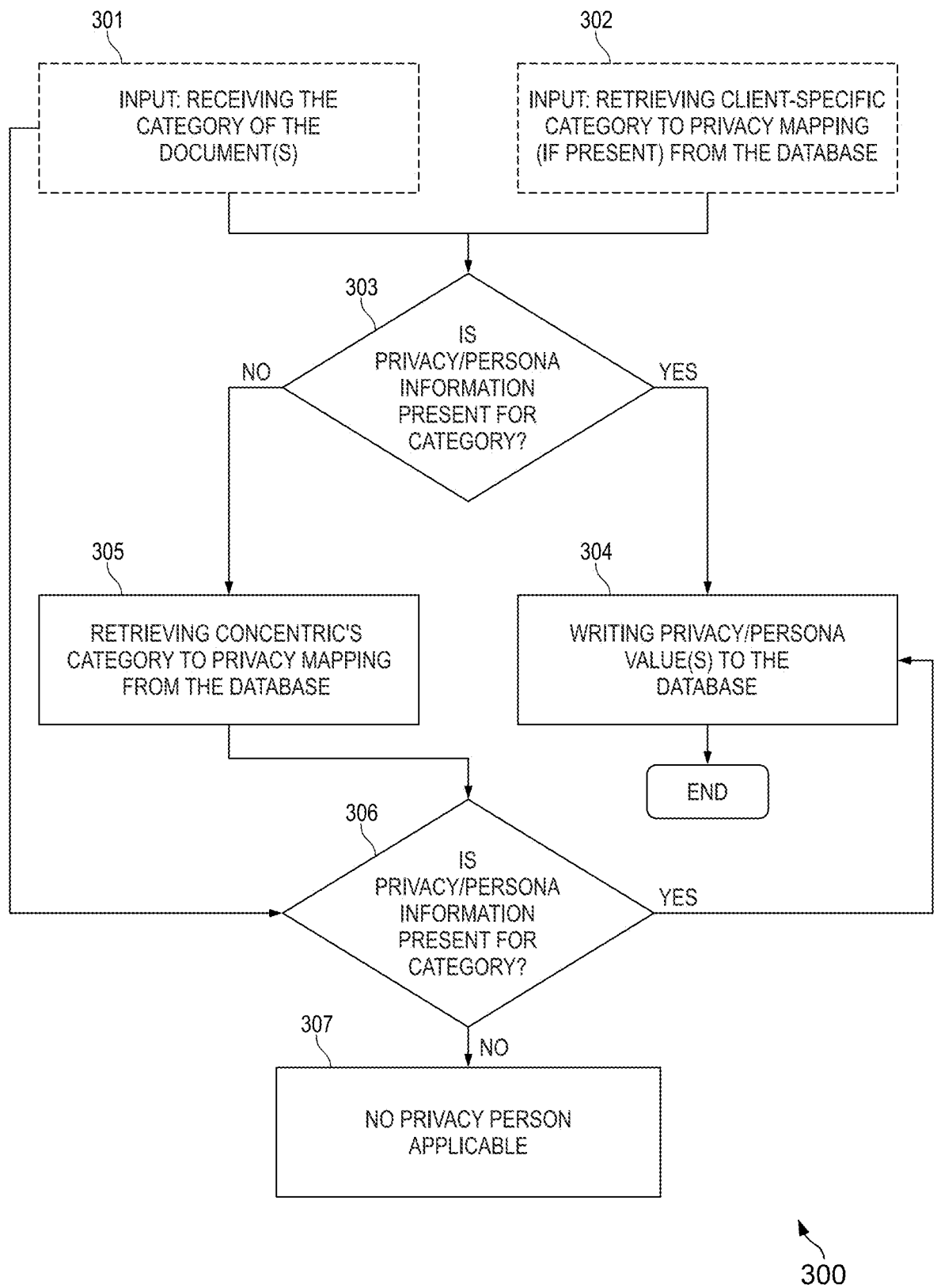
FIG. 3 is a flow diagram illustrating various operations for managing the at least one document performed by a privacy persona assignment engine, according to an embodiment as disclosed herein.

FIG. 3 is a flow diagram 300 illustrating various operations for managing the at least one document performed by the privacy persona assignment engine 143, according to an embodiment as disclosed herein.

At steps 301-302, the method includes receiving the category of the document(s) and retrieving client-specific category to privacy mapping (if present) from the database (i.e., the document database 111). At step 303, the method includes determining whether privacy/persona information is present for the received category. At step 304, the method includes writing/storing the privacy/persona value(s) to the database in response to determining that the privacy/persona information is present for the received category. At step 305, the method includes retrieving category to privacy mapping from the database in response to determining that the privacy/persona information is not present for the received category.

At step 306, the method includes determining whether the privacy/persona information is present for the received category. The electronic device 100 writes/stores the privacy/persona value(s) to the database in response to determining that the privacy/persona information is present for the received category. At step 307, the method includes determining that no appropriate privacy persona is applicable for the semantic category and no values are written to the database.

Figure 4:
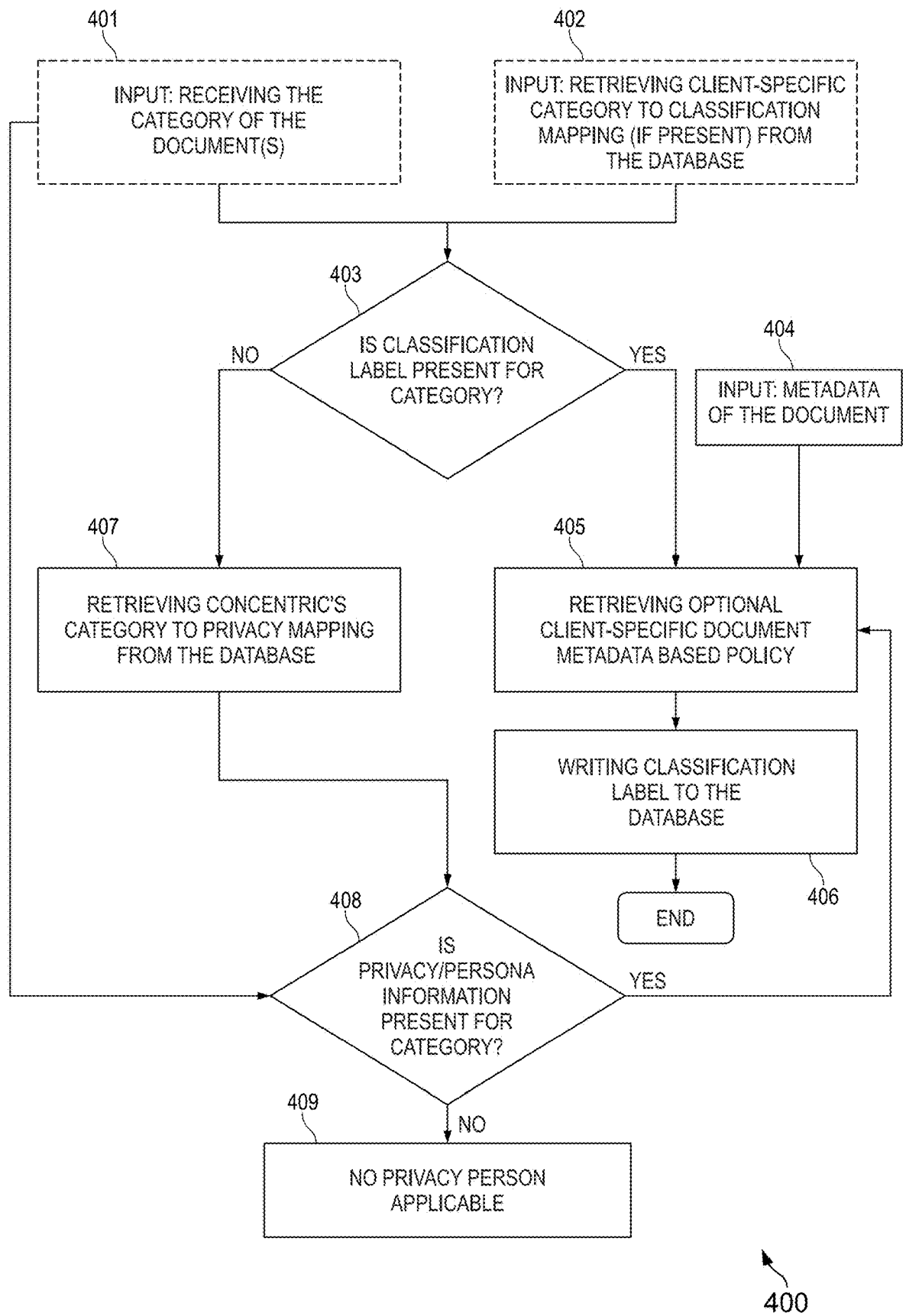
FIG. 4 is a flow diagram illustrating various operations for managing the at least one document performed by a classification label assignment engine, according to an embodiment as disclosed herein.

FIG. 4 is a flow diagram 400 illustrating various operations for managing the at least one document performed by a classification label assignment engine 144, according to an embodiment as disclosed herein.

At steps 401-402, the method includes receiving the category of the document(s) and retrieving client-specific category to classification mapping (if present) from the database (i.e., the document database 111). At step 403, the method includes determining whether the classification label(s) is present for the received category. At step 404, the method includes receiving the metadata of the document(s). At step 405, the method includes retrieving optional client-specific document metadata based on policy. At step 406, the method includes writing/storing the classification label in the database in response to determining that the classification label is present for the received category. At step 407, the method includes retrieving default category to classification mapping from the database in response to determining that the classification label is not present for the received category.

At step 408, the method includes determining whether the classification label is present for the received category. Electronic device 100 retrieves the optional client-specific document metadata-based policy and writes/stores the classification label in the database in response to determining that the classification label is present for the received category. At step 409, the method includes assigning the most restrictive classification level by default (e.g.: "confidential" in the case of three classification levels—public, internal and confidential) and writing to the database. Further, user is prompted to validate this value and the user can confirm the classification level or override it by specifying a different classification level.

The various actions, acts, blocks, steps, or the like in the flow diagrams 200, 300, and 400 may be performed in the order presented, in a different order, or simultaneously. Further, in some embodiments, some of the actions, acts, blocks, steps, or the like may be omitted, added, modified, skipped, or the like without departing from the scope of the invention.

The proposed invention describes a novel method and electronic device 100 for detecting the presence of certain types of sensitive information. The proposed method and electronic device 100 can assign privacy personas to who owns the private/personal information. The proposed method and electronic device 100 do not rely on patterns, rules, heuristics, or regular expressions, and it does not require private information to be fed in first before detecting it in other documents. Private information is detected with high precision by the proposed method and electronic device 100.

The proposed invention describes a novel method and electronic device 100 for automatically assigning an appropriate classification label(s) to a corpus of documents. The proposed method and electronic device 100 assign classification labels based on a mapping of semantic categories to classification levels. The proposed method and electronic device 100 result in a more effective and less error-prone classification regime compared to having users set classification labels for millions of individual documents in an enterprise environment. It is more intuitive and easier for users and domain experts to assign classification labels for a finite set of meaningful semantic categories of documents than to assign them individually to millions of documents. The proposed method and electronic device 100 allow clients to set their own category-to-classification mappings that override default mappings provided by Concentric. The proposed method and electronic device 100 allow clients to incorporate exceptions by utilizing document metadata-based policies in addition to the semantic category in the assignment of classification levels.

The embodiments disclosed herein can be implemented using at least one hardware device and performing document management functions.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

What is claimed is:

1. A method for managing at least one document by an electronic device, wherein the method comprises:
   receiving, by the electronic device, the at least one document in an electronic form, wherein the document comprises a plurality of content;
   determining, by the electronic device, at least one semantic category associated with the at least one document and a metadata associated with the at least one document;
   embedding, by the electronic device, custom data within the at least one document, the custom data comprising the at least one of the semantic category associated with the at least one document;
   determining, by the electronic device, at least one of a privacy persona of the at least one document and a classification label of the at least one document based on the at least one semantic category associated with the at least one document and the metadata associated with the at least one document; and
   determining, by the electronic device, an access to the at least one document based on at least one of the privacy persona of the at least one document and the classification label of the at least one document.

2. The method as claimed in claim 1, wherein the custom metadata further comprises at least one subcategory associated with each of the at least one semantic category associated with the at least one document.

3. The method as claimed in claim 1, wherein the method further comprises:
  storing, by the electronic device, the custom metadata along with the at least one document in a memory of the electronic device.

4. The method as claimed in claim 1, wherein the method further comprises:
  classifying, by the electronic device, the at least one document based on the classification label.

5. The method as claimed in claim 1, wherein the method further comprises:
  generating, by the electronic device, metadata representing the at least one determined privacy persona of the at least one document; and
  storing, by the electronic device, the metadata representing the at least one determined privacy persona along with the at least one document in a memory of the electronic device.

6. The method as claimed in claim 1, wherein the semantic category associated with the at least one document is determined based on Machine Learning (ML) technique.

7. The method as claimed in claim 1, wherein the privacy persona mapping comprises a mapping of a plurality of semantic categories to the privacy persona of a plurality of privacy persona and a user accessibility data based on each of the plurality of privacy persona and wherein the classification label is determined using a mapping between a plurality of semantic categories and a plurality of metadata associated with a plurality of documents.

8. The method as claimed in claim 1, wherein the method further comprises:
  generating, by the electronic device, a new metadata representing the at least one determined classification label of the at least one document; and
  storing, by the electronic device, the new metadata along with the at least one document in a memory of the electronic device.

9. The method as claimed in claim 1, wherein the method further comprises:
  determining, by the electronic device, at least one of a client-specific policy and rules on the classification label based on the at least one metadata associated with the at least one document; and
  modifying, by the electronic device, the at least one classification label of the at least one document based on at least one of the client-specific policy and the rules;
  storing, by the electronic device, the at least one modified classification label of the at least one document in a memory of the electronic device.

10. An electronic device for managing at least one document, wherein the electronic device comprises:
  a memory;
  a processor; and
  a document management module, operably connected to the memory and the processor, configured to:
    receive the at least one document in an electronic form, wherein the document comprises a plurality of content;
    determine at least one semantic category associated with the at least one document and a metadata associated with the at least one document;
    embed custom data within the at least one document, the custom data comprising the at least one of the semantic category associated with the at least one document;
    determine at least one of a privacy persona of the at least one document and a classification label of the at least one document based on the at least one semantic category associated with the at least one document and the metadata associated with the at least one document; and
    determine an access to the at least one document based on at least one of the privacy persona of the at least one document and the classification label of the at least one document.

11. The electronic device as claimed in claim 10, wherein the custom metadata further comprising at least one subcategory associated with each of the at least one semantic category associated with the at least one document.

12. The electronic device as claimed in claim 10, wherein the document management module is configured to:
  store the custom metadata along with the at least one document in a memory of the electronic device.

13. The electronic device as claimed in claim 10, wherein the document management module is configured to:
  classify the at least one document based on the classification label.

14. The electronic device as claimed in claim 10, wherein the document management module is configured to:
  generate metadata representing the at least one determined privacy persona of the at least one document; and
  store the metadata along with the at least one document in a memory of the electronic device.

15. The electronic device as claimed in claim 10, wherein the semantic category associated with the at least one document is determined based on machine learning (ML) technique.

16. The electronic device as claimed in claim 10, wherein the privacy persona mapping comprises a mapping of a plurality of semantic categories to the privacy persona of a plurality of privacy persona and a user accessibility data based on each of the plurality of privacy persona and wherein the classification label is determined using a mapping between a plurality of semantic categories and a plurality of metadata associated with a plurality of documents.

17. The electronic device as claimed in claim 10, wherein the document management module is configured to:
  generate a new metadata representing the at least one determined classification label of the at least one document; and
  store the new metadata along with the at least one document in a memory of the electronic device.

18. The electronic device as claimed in claim 10, wherein the document management module is configured to:
  determine at least one of a client-specific policy and rules on the classification label based on the at least one metadata associated with the at least one document; and
  modify the at least one classification label of the at least one document based on at least one of the client-specific policy and the rules;
  store the at least one modified classification label of the at least one document in a memory of the electronic device.

* * * * *